UNITED STATES PATENT OFFICE.

JOHN B. KING, OF BROOKLYN, ASSIGNOR, BY MESNE ASSIGNMENTS, TO S. R. WELLS & CO., OF NEW YORK, N. Y.

IMPROVEMENT IN COMPOSITIONS FOR WALLS AND ORNAMENTS.

Specification forming part of Letters Patent No. 218,538, dated August 12, 1879; application filed February 24, 1879.

*To all whom it may concern:*

Be it known that I, JOHN B. KING, of Brooklyn, in the State of New York, have invented an Improvement in Composition for Walls and Ornaments, of which the following is a specification.

The ordinary plastering upon walls is not fire-proof. It will disintegrate rapidly, and scale off under heat. Furthermore, it is liable to crack, especially if nails are driven in the same.

The object of this invention is to obtain strength in the plastic material, so that it is better adapted to walls, ornaments, casts, &c., than the plaster or composition heretofore employed, on account of the strength and toughness of my composition; and in cases where the said composition is exposed to the action of fire it becomes vitrified, and withstands the action of heat.

The ingredients I make use of are: Ordinary clay, (white kaolin preferred,) three parts, by weight; pulverized lava, one part, by weight; dextrine or similar gum, one part, by weight; fibrous material, such as cotton, paper, wool, or asbestus, one part, by weight; plumbago, ground, one part, by weight; glass, pulverized, one part, by weight.

These substances are to be mixed together intimately, and sufficient water added to render the mass plastic, and a small quantity of plaster-of-paris is employed to cause the material to set or consolidate with rapidity.

Architectural and other ornaments may be made of this material pressed in molds; also, works of art, decorations, walls, ceilings, picture-frames, models, &c. This composition requires but little water to render it plastic; hence, when laid upon laths they do not swell as much as with ordinary mortar, and the subsequent shrinkage is less. The material is very tough and strong when dry, and if exposed to a high temperature it vitrifies, and does not crack and scale as ordinary plaster.

I am aware that dextrine has been used with fiber and plaster to form a composition for ornaments. I do not claim the same.

I claim as my invention—

The composition of clay, lava, dextrine, fiber, plumbago, and glass, in about the proportions set forth.

Signed by me this 19th day of February, A. D. 1879.

JOHN B. KING.

Witnesses:
GEO. T. PINCKNEY,
CHAS. H. SMITH.